United States Patent [19]

Huynh

[11] Patent Number: 5,942,860
[45] Date of Patent: Aug. 24, 1999

[54] ELECTRONIC BALLAST FOR A HIGH INTENSITY DISCHARGE LAMP WITH AUTOMATIC ACOUSTIC RESONANCE AVOIDANCE

[75] Inventor: Phuong T. Huynh, Columbia, Md.

[73] Assignee: Philips Electronics North America Corporation, New York, N.Y.

[21] Appl. No.: 08/931,397

[22] Filed: Sep. 16, 1997

[51] Int. Cl.[6] .................................................. G05F 1/00
[52] U.S. Cl. ........................ 315/307; 315/308; 315/224; 315/DIG. 7
[58] Field of Search .................................. 315/307, 291, 315/292, 224, 308, DIG. 7, 209 R

[56] References Cited

U.S. PATENT DOCUMENTS

| | | | |
|---|---|---|---|
| 3,890,537 | 6/1975 | Park et al. ............................... | 315/208 |
| 4,373,146 | 2/1983 | Bonazoli et al. ..................... | 315/209 R |
| 5,225,742 | 7/1993 | Beasley .................................. | 315/307 |
| 5,235,255 | 8/1993 | Blom ...................................... | 315/224 |
| 5,569,984 | 10/1996 | Holtslag ................................. | 315/307 |
| 5,623,187 | 4/1997 | Caldeira et al. ....................... | 315/307 |
| 5,680,015 | 10/1997 | Bernitz et al. ......................... | 315/291 |
| 5,859,505 | 1/1999 | Bergman et al. ...................... | 315/307 |

*Primary Examiner*—Haissa Philogene
*Attorney, Agent, or Firm*—Bernard Franzblau

[57] ABSTRACT

A ballast for a high intensity discharge lamp which detects the onset of acoustic resonance instability by detecting an asymmetry in a signal which is otherwise symmetric in the absence of such instability. The AC supply ripple voltage, which is normally present in the lamp current, exhibits symmetry in the absence of acoustic resonance, and becomes substantially asymmetric at the onset of acoustic resonance. By measuring the duration of each half cycle in the ripple voltage, an asymmetry in the ripple voltage can be easily and rapidly detected, and the operating frequency of the lamp current is changed before the resonance produces visually apparent flicker.

25 Claims, 4 Drawing Sheets

ELECTRONIC BALLAST FOR A HIGH INTENSITY DISCHARGE LAMP WITH AUTOMATIC ACOUSTIC RESONANCE AVOIDANCE

BACKGROUND OF THE INVENTION

1. Field of the Invention

This invention relates to the control of a high intensity discharge lamp. Specifically it addresses the design of a ballast to minimize the flicker caused by acoustic resonance instability.

2. Discussion of Related Art

Driving high-pressure arc discharge lamps can produce standing pressure waves inside the arc discharge tube, which may cause the discharge to become chaotic. The chaotic discharge can result in an annoying flicker of the light output. There exists a certain range of frequencies where the lamp can be driven without causing arc instability. Electronic ballasts can be designed to operate within this acoustic-resonance-free window. However, as the lamp ages and for other reasons not yet understood, acoustic resonance instability can occur irregularly within this window.

Conventionally, the operating frequencies at which acoustic resonance is likely can be computed, and the ballast is designed to avoid operation at these frequencies. Such designs, however, are highly dependent upon the physical characteristics of the particular lamp, and similarly dependent upon the change of these characteristics as the lamp ages or is exposed to differing environmental conditions.

Canadian Patent Application 2160864 discloses the use of an initial test phase wherein the frequency of operation is varied within a range, and the lamp is monitored for quiet and stable operation at each frequency. After this test phase is completed, the lamp is set to operate within the window formed by the largest number of contiguous frequencies which provided quiet and stable operation during the test phase. The test phase is initiated with each startup of the lamp, and thereby adjusts for unstable operations caused by the aging of the lamp. During the test phase, the lamp may be operated at a frequency at which acoustic resonance is produced, which may induce visually disturbing flicker.

Recognizing that acoustic resonance causes a change in the lamp voltage and/or current, U.S. Pat. 5,569,984 discloses the sampling of a characteristic of the lamp, such as its conductance, about a span of frequencies, and then setting the operating frequency to that frequency which exhibits the least amount of deviation in that characteristic. This sampling is performed both during initial startup, as well as when the lamp is in a steady state condition.

In each of these implementations, the proper operating frequency is determined by purposely operating the lamp at a variety of frequencies, some of which may induce acoustic resonance, and then selecting the proper operating frequency from among those which did not cause acoustic resonance during the sampling, or test, period.

SUMMARY OF THE INVENTION

It is an object of this invention to provide a means of avoiding acoustic resonance instability by detecting the onset of instability, and adjusting the frequency of operation before the instability produces the visually annoying flicker.

Rather than attempting to minimize the likelihood of operating at a frequency which induces acoustic resonance, a device in accordance with this invention operates at a given frequency until acoustic resonance commences, and then switches to another frequency. To be effective, however, the preferred embodiments assure that the detection and switching occur before acoustic resonance results in visibly disturbing flicker.

The onset of acoustic resonance instability is detected by measuring the symmetry of a characteristic signal which appears in the lamp voltage. When the lamp is stable, the characteristic signal is symmetric. At the onset of instability, the characteristic signal becomes distorted and asymmetric. By measuring a selected parameter of this characteristically symmetric signal, the onset of instability can be detected as soon as the asymmetry of this parameter becomes apparent. In a preferred embodiment, the AC line ripple voltage which propagates through to the lamp comprises this characteristic signal, and the time duration of each half cycle of this AC ripple voltage signal form the symmetry-asymmetry detection parameter. During stable, non-acoustic resonance, periods, the durations of each half cycle of the AC line ripple voltage are substantially equal, and predictable. At the onset of acoustic resonance, the durations of each half cycle will be significantly different from the predicted duration, as well as different from each other.

DETAILED DESCRIPTION OF THE PREFERRED EMBODIMENTS

Figure 1:
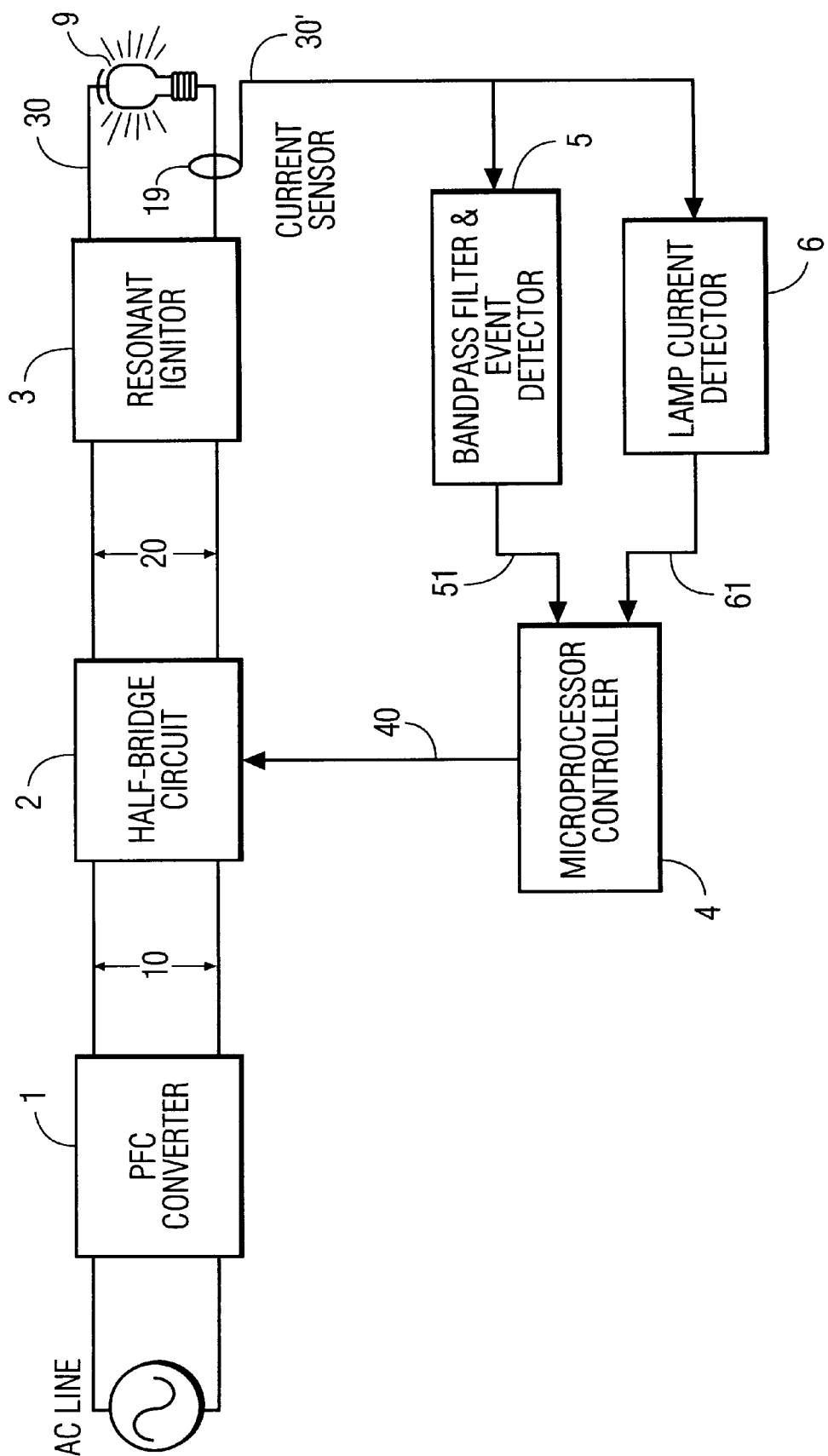
FIG. 1 shows a block diagram of a high frequency electronic ballast for a high intensity discharge lamp in accordance with this invention.

FIG. 1 shows a block diagram of a preferred embodiment of a high frequency electronic ballast for a High Intensity Discharge (HID) lamp. The lamp 9 is ignited by a resonant ignitor 3, which receives its excitation voltage and current from a bridge circuit such as, but not limited to, a half-bridge circuit 2. As is common in this field of the art, the half bridge circuit 2 is triggered by a control signal 40 which controls the generation of the high frequency signal 20 which excites the resonant ignitor. The frequency of this signal 20, and the resultant current 30 to the lamp 9, is determined by the control signal 40. A DC voltage 10 is applied to the half bridge circuit 2 by a converter 1, derived from the AC line supply 7. Of note, the DC voltage 10 contains a remnant of the AC line supply, in the form of a ripple voltage, typically at twice the line supply frequency. This ripple voltage propagates through the half bridge circuit 2 and the resonant ignitor 3, and appears in the current 30 supplied to the lamp.

In the preferred embodiment, the control signal 40 is supplied by a microprocessor controller 4. As discussed above, the frequency of operation is determined by this control signal 40. If the frequency of operation produces standing waves in the lamp 9, the lamp can produce visually annoying flicker. Thus, a function of the controller is to avoid the production of standing waves. In accordance with this invention, this avoidance can be effected by detecting a non-symmetry in the ripple voltage in the lamp current 30.

Figure 2:
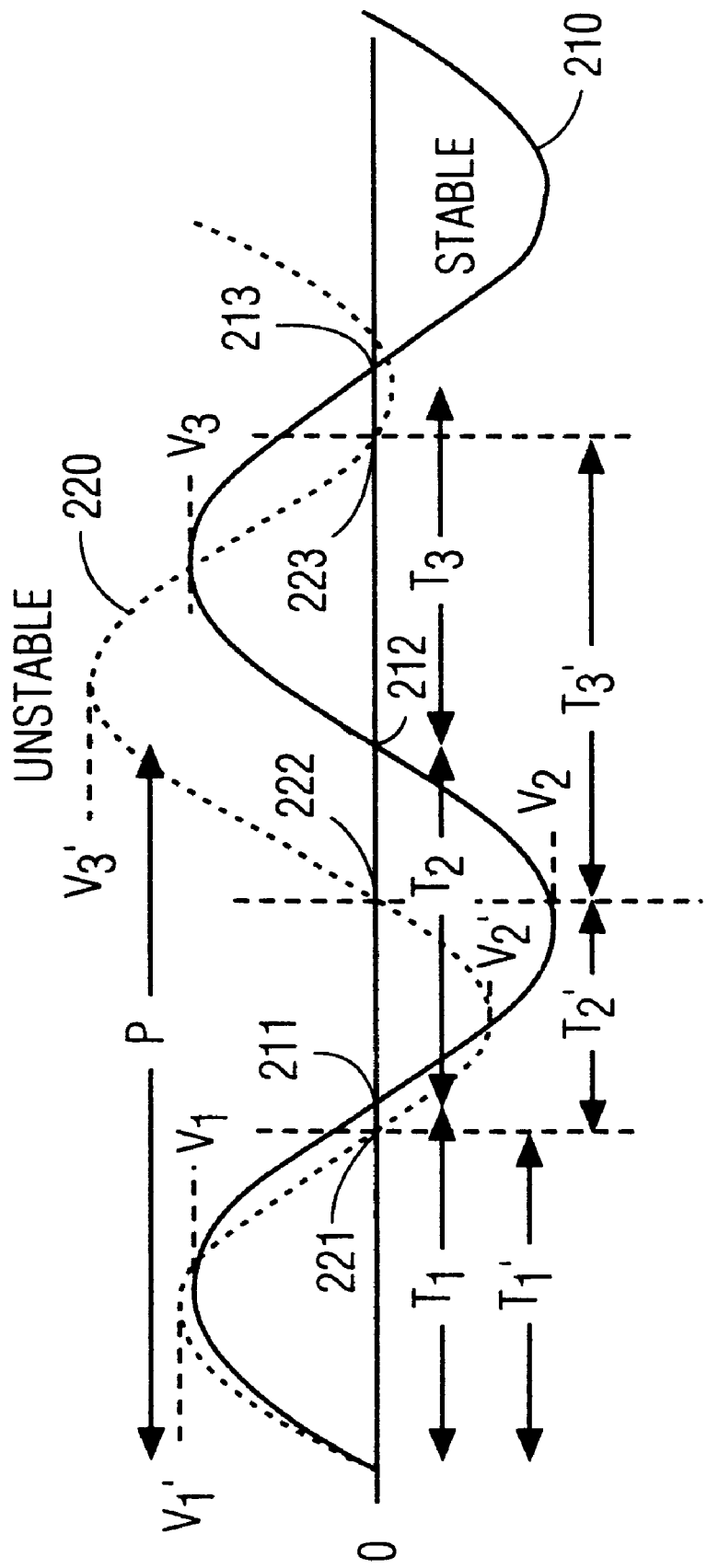
FIG. 2 is a timing diagram depicting the ripple voltage under stable and unstable lamp conditions.

As shown in FIG. 2, the ripple voltage under stable conditions, depicted as signal 210, is symmetric. This symmetry is reflected in the time domain as well as in the voltage amplitude domain; each half cycle consumes the same amount of time, and the peak amplitudes at each half cycle are of equal magnitude. The time between zero crossings 211, 212, and 213, shown as Ti, T2 and T3, are equal. As depicted as signal 220, the onset of instability introduces a distortion in the ripple voltage; this distortion may be exhibited as a shift in bias or frequency or both. As shown, the zero crossings 221, 222, and 223 do not occur at equal intervals. T2' is shorter than T1', and both are shorter than T3'.

The current sensor 19 produces a sensed current 30' which is directly proportional to the lamp current 30, including a signal in direct proportion to the ripple voltage. This signal 30' is provided to the bandpass filter and event detector 5 of FIG. 1. The filter and detector 5 performs two functions. The filter portion separates the relatively low frequency ripple voltage from the high frequency lamp current, and the event detector portion detects the occurrence of an event which is expected to be symmetric in time. In the preferred embodiment, the zero crossings of the low frequency ripple voltage are used as the symmetric events. The filter and detector 5 produces a signal 51 in correspondence with the occurrence of zero crossings (211, 212, etc.) of the ripple voltage component of the sensed current 30'. Using this signal 51, the controller 4 measures the duration (T1, T2, etc.) between each of these zero crossings. Each measured half cycle duration can be compared to an expected duration value to determine the occurrence of an asymmetry. For example, if the ripple voltage is known to have a frequency of 100 Hz, the period P in FIG. 2 is 10 milliseconds. Each measured half cycle, T1, T2, T3, etc. should be 5 milliseconds in duration. A significant change from this expected value would be indicative of the onset of acoustic resonance. Alternatively, the duration of each half cycle (T2, T3, for example) can be compared to the duration of the preceding half cycle (T1, T2, respectively), thereby eliminating the need to know, a priori, the ripple voltage period P. A significant difference between the duration of successive half cycles would be indicative of the onset of acoustic resonance.

For completeness, also shown in FIG. 1 is a lamp current detector 6. The output 61 from this detector is provided to the controller 4. This signal 61 is used, for example, by the controller 4 to determine when the lamp is actually ignited. This determination may be used to inhibit the operation of the acoustic resonance avoidance techniques disclosed in this invention until after the lamp is actually ignited, thereby allowing the execution of an ignition sequence without interference from the acoustic resonance avoidance techniques herein disclosed.

Figure 4:
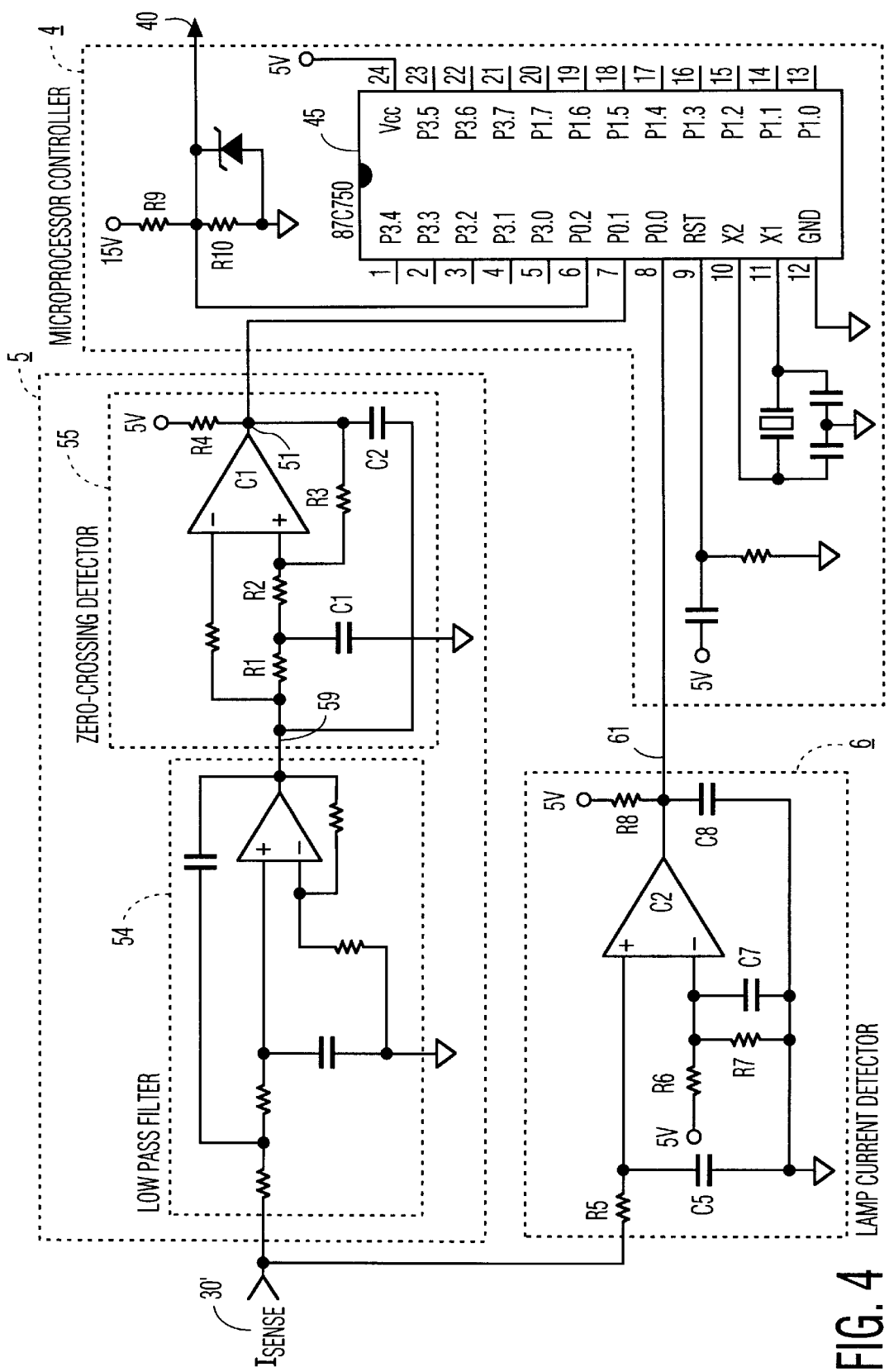
FIG. 4 shows a circuit diagram for the acoustic resonance detection and control devices in accordance with this invention.

FIG. 4 shows the circuit diagram for a bandpass filter and event detector, a lamp current detector, and a controller in accordance with a preferred embodiment of this invention. The components, signals, and elements identified in FIGS. 1 and 4 by like numerals are similar in construction and operation. The low pass filter 54 separates the detection signal 59 from the sensed lamp current 30'. The detection signal 59, in the preferred embodiment, is a measure of the ripple voltage component in the sensed current 30'. As mentioned above, the ripple voltage will typically be at twice the AC line supply frequency, either 120 Hz or 100 Hz, and the components of the low pass filter 54 will be selected accordingly, using conventional bandpass filter design techniques. The zero-crossing detector block 55 is configured to produce a square wave output 51 from the detection signal 59. Each transistion of the square wave output, from high to low, and from low to high, demarcates the zero crossings of the detection signal 59. This square wave signal is provided to the microprocessor 45. Using techiques common in the art, the microprocessor 45 measures the time duration between each high-low and low-high transistions of the square wave 51, thereby measuring the duration of each half cycle of the detection signal 59, which, in the absense of the onset of acoustic resonance should be equal to half the period of the ripple voltage from the AC supply. If the measured durations are significantly different than half the ripple voltage period, or if a significant asymetry exists between successive half cycle measurements, the microcontroller 45 modifies the control signal 40 so as to change the operating frequency of the lamp.

A zero crossing detector is utilized in the preferred embodiment because such detectors are relative simple and inexpensive. However, within the spirit and intent of this invention, other event-detection means, common to one skilled in the art, could be employed to determine an asymmetry in the time domain. The function of the signal 51 and controller 4 is to measure the time duration between successive events, wherein these time durations are known to exhibit a predictable pattern, or symmetry, in the absence of acoustic resonance, and wherein these time durations are known to exhibit a distortion, or asymmetry, at the onset of acoustic resonance. Consistent with this invention, a detection signal having the above symmetry-asymmetry characteristics, other than the ripple voltage, could be generated by the controller 4, or other circuitry, and purposely added to the lamp current before or after the resonant ignitor 30.

Figure 3:
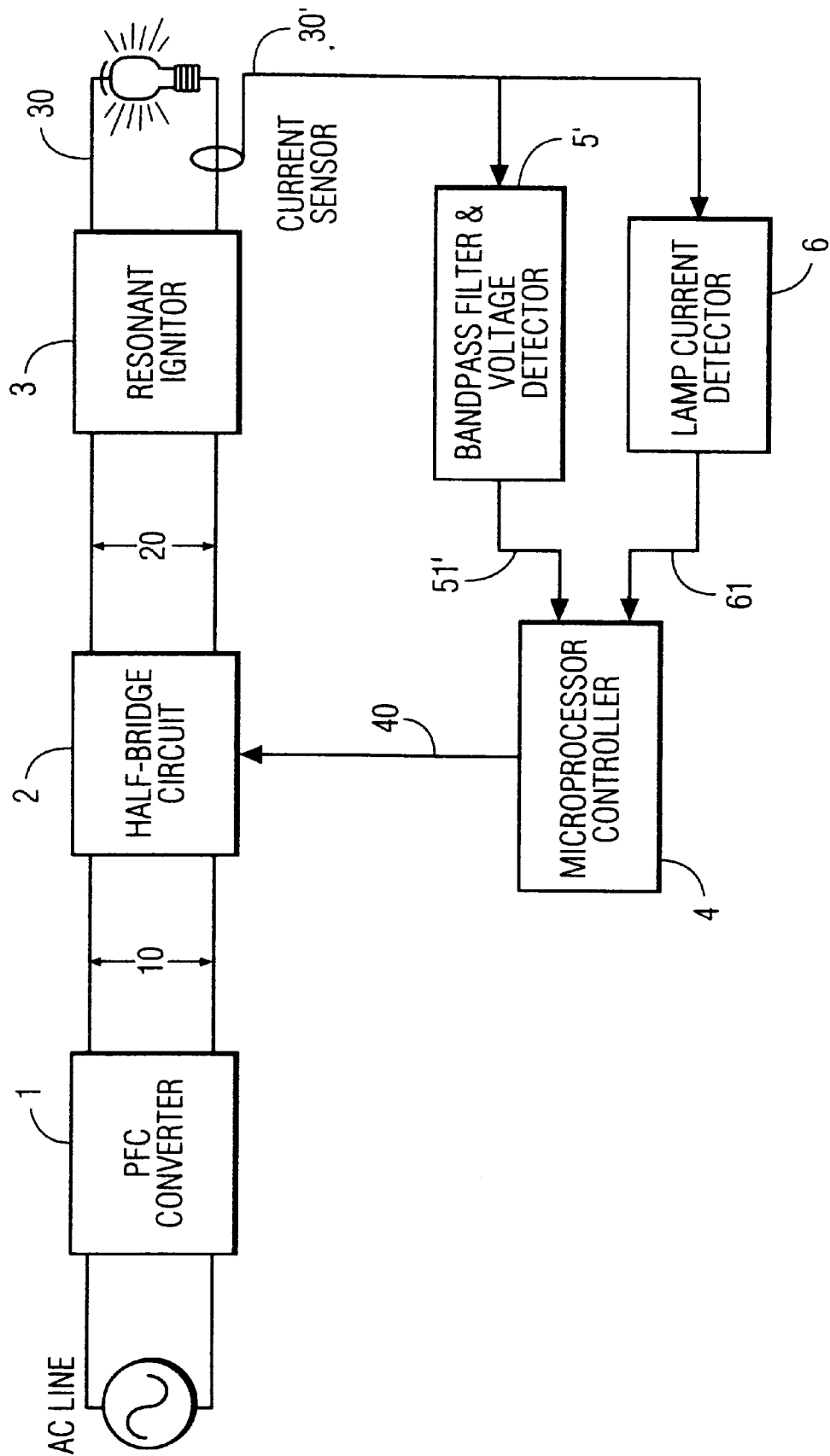
FIG. 3 shows a block diagram of a high frequency electronic ballast for a high intensity discharge lamp in accordance with an alternative embodiment of this invention.

Commensurate with this invention, an alternative detection means could comprise a means for measuring other symmetric parameters of the detection signal besides the time of occurrence of events. The amplitude of each peak of the ripple voltage, for example, are symmetric in the absence of acoustic resonance, and are asymmetric at the onset of acoustic resonance. The configuration of FIG. 3 is identical to that of FIG. 1, except that the detection device 5' is a voltage level measuring device, rather than a zero crossing detector. The components, signals, and elements identified in FIGS. 1 and 3 by like numerals are similar in construction and operation. As shown in FIG. 2, in the absence of acoustic resonance, voltage peaks V1, V2, and V3 have equal magnitudes relative to the zero voltage axis. Signal 51' from detection device 5' is a measure of these peak voltage levels. At the onset of acoustic resonance, the voltage peaks V', V2', and V3' are substantially changed, and communicated to the controller 4 by signal 51'. A significant change in the peak voltage of a half cycle would be indicative of the onset of acoustic resonance. Alternatively, assuming the ripple voltage to be centered about a zero reference voltage line, the average algebraic value of two successive half cycle peaks, as measured on signal 51' at each half cycle, should be zero. A significant difference from zero in this average voltage would be indicative of the onset of acoustic resonance. These and other techniques for detecting symmetry and asymmetry are known in the art and are within the spirit and scope of this invention.

Also commensurate with this invention, the function of the filter and event detector 5, or filter and voltage detector 5', could be performed within the microprocessor controller 4, employing digital filtering techniques common to those skilled in the art.

The operation of the preferred embodiment in FIG. 1 is further detailed as follows. The controller 4 produces the signal 40 for an operating frequency within the band of acoustic resonance free frequencies. When the lamp is operated at this frequency, the controller monitors the duration of each half cycle of the ripple voltage, as discussed above. If the durations of each half cycles differ from an expected value by more than might be expected due to random noise, i.e. if the difference between the duration and the expected value exceeds a threshold value, the signal 40 is adjusted so as to change the frequency of operation. Typically, this change of frequency may be an increase by a fixed amount until the upper bound of the acoustic resonance free band is reached, then either cycled back to the lower bound, or subsequently decreased by a fixed amount until the lower bound is reached. Alternatively, a set of predefined frequencies can be stored in a memory associated with the microprocessor 4, and either cycled through or randomly selected. Any number of means can be employed to select a new operating frequency, as would be evident to one skilled in the art.

The detection of the onset of instability can thus be accomplished within one or two half cycles of the ripple voltage, and the change of frequency can be effected within the next half cycle. Thus, in accordance with this invention, the duration of acoustic resonance at the prior operating frequency will be less than two cycles of the ripple voltage. The ripple voltage frequency will typically be 120 Hz in the United States, and 100 Hz in Europe. Thus, the duration of flicker, if any, will be less than 20 milliseconds, and therefore not visibly apparent.

In accordance with this invention, if sufficient time is available between the onset of acoustic resonance and the occurrence of visibly apparent flicker, additional processing of the detection signal could also be employed to improve the noise insensitivity of the device, or to minimize the likelihood of an erroneous determination of acoustic resonance. For example, the criteria used for asserting the onset of acoustic resonance could be the detection of multiple asymmetric half cycles, for example three or four measured asymmetric half cycles in a row. Although two or three cycles of the ripple voltage may be required for this more conservative determination of the onset of acoustic resonance, two or three cycles duration from the onset of acoustic resonance will typically be insufficient to produce visibly apparent flicker.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. A ballast for a high intensity discharge lamp, comprising:
    means for generating an operating voltage for said lamp, said operating voltage having an operating frequency,
    means for adjusting said operating frequency,
    means for detecting a detection signal which,
        in the absence of acoustic resonance is symmetric, and which,
        at the onset of acoustic resonance is asymmetric, and
    means for detecting said asymmetry,
    wherein said operating frequency is adjusted in dependence upon the detection of said asymmetry.
2. A ballast as claimed in claim 1, wherein
    said detection signal is a ripple voltage derived from an AC supply voltage.
3. A ballast as claimed in claim 1, wherein
    said detection signal periodically transitions through a specified reference voltage, and
    said means for detecting said asymmetry comprises means for measuring the time duration between said transitions through the specified reference voltage.
4. A ballast as claimed in claim 3, wherein
    said detection signal varies between a minimum and maximum voltage level in the absence of acoustic resonance, and
    said specified reference voltage is at the midpoint between said minimum and maximum voltage levels.
5. A ballast as claimed in claim 3, wherein
    said means for detecting said asymmetry further comprises
    means for measuring a first and second time duration between said transitions through the specified reference voltage, and
    said detection of said asymmetry is dependent upon the difference between said first and second time durations.
6. A ballast as claimed in claim 1, wherein
    said detection signal periodically transitions through a specified reference voltage, and
    said means for detecting said asymmetry comprises means for measuring the extent to which the detection signal differs from said specified reference voltage.
7. A ballast as claimed in claim 6, wherein
    said detection signal varies between a minimum and maximum voltage level in the absence of acoustic resonance, and
    said specified reference voltage is at the midpoint between said minimum and maximum voltage levels.
8. A ballast as claimed in claim 6, wherein
    said means for detecting said asymmetry further comprises
    means for measuring a first and second deviation of the detection voltage from the specified reference voltage, and
    said detection of said asymmetry is dependent upon the difference between said first and second deviations.
9. A ballast as claimed in claim 6, wherein
    said means for detecting said asymmetry further comprises
    means for measuring a first and second deviation of the detection voltage from the specified reference voltage, and
    said detection of said asymmetry is dependent upon the average of said first and second deviations.
10. A method for detecting instability in a lamp, comprising the steps of:
    measuring a parameter of a characteristic signal,
        said characteristic signal being symmetric during periods of stable lamp operation, and asymmetric at the onset of instability of said lamp operation,
    determining the degree of asymmetry of said characteristic signal by said measurement of said parameter, and
    asserting the onset of instability when said degree of asymmetry exceeds a specified level.
11. A method as claimed in claim 10, wherein said measured parameter is a time duration.
12. A method as claimed in claim 10, wherein said measured parameter is an amplitude of said characteristic signal.

13. A method as claimed in claim 10, wherein
said characteristic signal varies in amplitude with time,
said variations in amplitude having cycles of positive and negative deviations and
said parameter of said characteristic signal is the time duration of said cycles of said characteristic signal.

14. A method as claimed in claim 10, wherein
said characteristic signal varies in amplitude with time, and
said parameter of said characteristic signal is the time variant amplitude of said characteristic signal.

15. An apparatus for controlling a lamp, comprising:
a controller,
a power supply for providing an operating current to said lamp, said current having an operating frequency,
said controller being connected to said power supply so as to control said operating frequency,
said operating current comprising a detection signal,
said detection signal having an amplitude which varies in time, having a cyclic period,
said apparatus further comprising means for measuring a characteristic of said cycles of said detection signal, and wherein
said controller controls said operating frequency in dependence upon said characteristic measurements.

16. An apparatus as claimed in claim 15, wherein said detection signal is a ripple voltage of an AC supply voltage.

17. An apparatus as claimed in claim 15, wherein said characteristic of the cycles of the detection signal is the time duration of half cycles of the detection signal.

18. An apparatus as claimed in claim 17, wherein
said detection signal is a ripple voltage of an AC supply voltage.

19. An apparatus as claimed in claim 15, wherein said characteristic of the cycles of the detection signal is the peak amplitude of the detection signal within each half cycle of the detection signal.

20. An apparatus as claimed in claim 19, wherein
said detection signal is a ripple voltage of an AC supply voltage.

21. A ballast apparatus for a high intensity discharge lamp, comprising:
means for generating a high frequency operating voltage for said discharge lamp, said operating voltage having a low frequency detection signal component,
means for adjusting said high operating frequency,
means for detecting the low frequency detection signal which,
in the absence of acoustic resonance is symmetric, and which,
at the onset of acoustic resonance is asymmetric, and
means for detecting said asymmetry,
wherein said high operating frequency is adjusted by said adjusting means dependent upon the detection of said asymmetry so as to restore the symmetry of the low frequency detection signal.

22. A ballast apparatus as claimed in claim 21, wherein
said detection signal periodically transitions through a specified reference voltage, and
said means for detecting said asymmetry operates on the basis of the time duration between said transitions through the specified reference voltage.

23. A ballast apparatus as claimed in claim 21, wherein
said detection signal periodically transitions through a specified reference voltage, and
said means for detecting said asymmetry operates on the basis of differences in amplitude of said low frequency detection signal in respective half cycles thereof.

24. A ballast apparatus as claimed in claim 21 wherein said low frequency detection signal component is a ripple frequency equal to twice the frequency of an AC supply voltage applied to input terminals of the ballast apparatus.

25. A ballast apparatus as claimed in claim 21 wherein said adjusting means maintains the high frequency operating voltage at a given high frequency while said low frequency detection signal is symmetric and only adjusts the high frequency operating voltage to a different high frequency when the onset of asymmetry in the low frequency detection signal component is detected.

* * * * *